(12) United States Patent
Passoke et al.

(10) Patent No.: US 6,234,890 B1
(45) Date of Patent: May 22, 2001

(54) FILLING MACHINE FOR SAUSAGE MEAT OR THE LIKE HAVING A SUPPLY CONTAINER WHICH CAN BE PIVOTED AWAY

(75) Inventors: Helmut Passoke, Eystrup; Heyo Frerichs, Verden, both of (DE)

(73) Assignee: Vemag Maschinen-und Anlagenbau GmbH, Verden/Aller (DE)

( * ) Notice: Subject to any disclaimer, the term of this patent is extended or adjusted under 35 U.S.C. 154(b) by 0 days.

(21) Appl. No.: 09/477,239

(22) Filed: Jan. 4, 2000

Related U.S. Application Data

(63) Continuation of application No. PCT/EP99/03143, filed on May 7, 1999.

(30) Foreign Application Priority Data

May 8, 1998 (DE) .......................................... 298 08 373 U

(51) Int. Cl.⁷ .................................................. A22C 11/02
(52) U.S. Cl. ................ 452/30; 452/35; 366/248
(58) Field of Search ................... 452/30, 35, 45; 366/242, 244, 248, 41, 64, 65, 320

(56) References Cited

U.S. PATENT DOCUMENTS

| | | | |
|---|---|---|---|
| 4,724,582 | * 2/1988 | Kunig et al. | ............................ 452/30 |
| 4,895,278 | 1/1990 | Mataro . | |
| 5,352,150 | * 10/1994 | Markwardt | ............................ 452/30 |

FOREIGN PATENT DOCUMENTS

| | | |
|---|---|---|
| 18 39 808 | 8/1961 | (DE) . |
| 1 136 605 | 9/1962 | (DE) . |
| 18 39 007 | 2/1963 | (DE) . |
| 36 17 560 | 11/1987 | (DE) . |
| 91 05 198 | 8/1991 | (DE) . |
| 297 14 951 | 2/1999 | (DE) . |
| 0 313 123 | 4/1989 | (EP) . |
| 0 511 608 | 11/1992 | (EP) . |
| 1056529 | 4/1964 | (GB) . |

* cited by examiner

*Primary Examiner*—Willis Little
(74) *Attorney, Agent, or Firm*—Altera Law Group LLC

(57) ABSTRACT

Described is a filling machine comprising a machine frame structure and a supply container which is pivotable from an operative position into a pivoted-away position and in front of the outlet of which is disposed a feed device which can be driven in rotation, in such a way that it can be pivoted away together with the supply container. In that respect there is provided a two-part drive ring for the feed device, of which the first ring part is mounted to the machine frame structure and is driven there, and the second ring part carries the feed device and can be pivoted away together with the supply device and in the operative position of the supply container is so coupled to the first ring part that the first ring part carries forces acting on the feed device and rotationally entrains the second ring part for driving the feed device.

14 Claims, 5 Drawing Sheets

Figure 1:
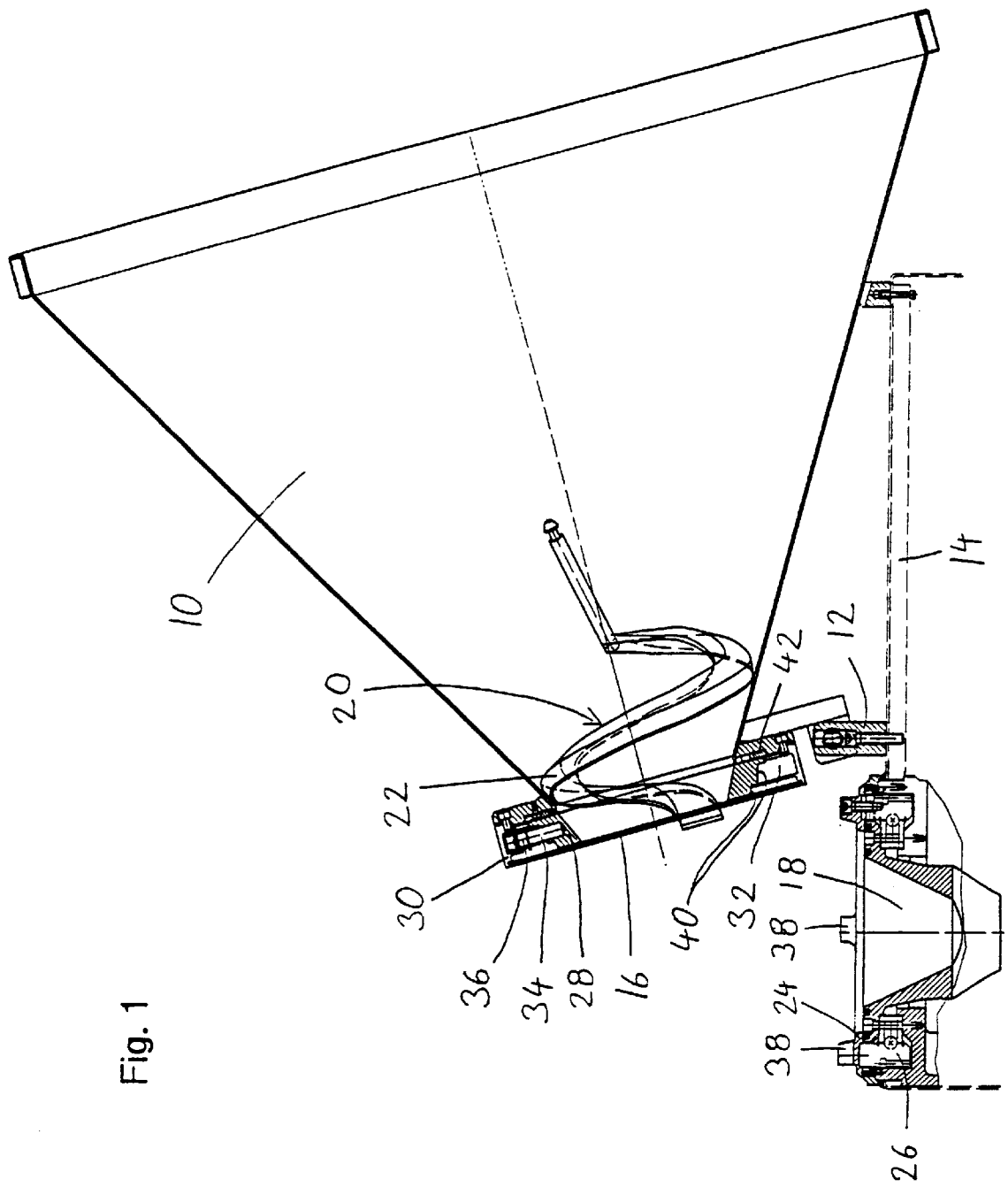

FILLING MACHINE FOR SAUSAGE MEAT OR THE LIKE HAVING A SUPPLY CONTAINER WHICH CAN BE PIVOTED AWAY

This application is a continuation of PCT/EP99/03143 filed May 7, 1999.

The invention concerns a filling machine comprising a machine frame structure and a supply container which is pivotable from an operative position into a pivoted-away position and in front of the outlet of which is disposed a feed device which can be driven in rotation, in such a way that it can be pivoted away together with the supply container.

Such filling machines serve for example to introduce sausage meat or the like for example into sausage casings. Known filling machines have a machine frame structure in which there is disposed a delivery pump for for example sausage meat which is supplied from a supply container which is generally in the form of a hopper or funnel. That supply container generally sticks up above the machine frame structure and is provided with a helical feed device which extends along the wall of the supply container and whose diameter possibly increases in an upward direction like the diameter of the supply container. The feed device is driven and conveys meat adhering for example to the wall of the supply container downwardly in the supply container towards the delivery pump.

As the supply container generally sticks up above the machine frame structure and thus greatly impedes access for example to the delivery pump, the supply container is frequently designed in such a way that it can be pivoted away to the side. In that case, the feed device is pivoted together with the supply container. Pivotal movement of the supply container away from the machine is required for example when the lower part of the delivery path or the delivery pump have to be cleaned.

There are situations of use in which there is no wish to employ a feed device. For such cases, and for cleaning purposes, it should be possible to remove the feed device. The totality of the desired requirements, namely pivotability of the supply container together with the feed device, the possibility of dismantling the feed device, and the drive and mounting means for the feed device, constitute high demands in terms of the design structure of a filling machine.

Those demands are met by a filling machine in which the feed device is connected to a toothed ring which is releasably mounted in the lower part of a supply container which can be pivoted away, the toothed ring engaging into the pinion of a drive which is disposed in the machine frame structure, when the supply container is in the operative position, when it is not pivoted away.

A consideration which is unsatisfactory in the state of the art is that the feed device can only be dismantled with the involvement of a complicated procedure and high forces are applied to the pivotable supply container.

Therefore the object of the present invention is to afford an alternative filling machine which very substantially overcomes the disadvantages of the state of the art.

In accordance with the invention, that object is achieved with a filling machine of the kind set forth in the opening part of this specification, which is distinguished by a two-part drive ring for the feed device, whose first ring part is supported in the machine frame structure and is driven there and whose second ring part carries the feed device and can be pivoted away together with the supply container and in the operative position of the supply container is so coupled to the first ring part that the first ring part carries forces acting on the feed device and rotationally entrains the second ring part for driving the feed device. A great advantage of this structure is that, even when the feed device is being driven, the supply container is only subjected to the action of those forces which are applied by the feed device indirectly, for example by the meat, to the walls of the supply container. The supply container however does not have to carry the reaction and drive forces which act on the feed device as they are carried by the first part of the drive ring, which is supported in the machine frame structure. The mounting arrangement in the machine frame structure can readily be of a robust nature as it does not have to be released in contrast to the mounting arrangement for the feed device in the supply container. That affords a second great advantage of the invention, more specifically that the feed device can already be held by a simple holding configuration in the pivotable supply container. Designing such a simple holding configuration to be releasable is substantially simpler than providing a releasable mounting arrangement. The robust mounting arrangement for the feed device in the machine frame structure is moreover reflected in a higher degree of reliability of the filling machine.

A preferred filling machine is one in which the second part of the drive ring, in the operative position of the supply container, engages into the first part of the ring in such a way that the first ring part carries forces acting on the feed device and rotationally entrains the second ring part for driving the feed device. By virtue of that engagement of the second ring part into the first ring part of the drive ring, a further coupling between those two ring parts is superfluous. At the same time, a force flux is produced in a simple manner between those two ring parts; by virtue of that force flux, both the reaction and also the drive forces acting on the feed device can be transmitted to the first part of the support ring and further by way of the mounting arrangement thereof to the machine frame structure.

The drive ring is preferably arranged substantially horizontally and divided horizontally. That design configuration is advantageous in particular in the case of a supply container which is arranged above the machine frame structure, and has the result that the first ring part, as the lower part of the drive ring, is supported in the machine frame structure while the second ring part, as the upper part of the drive ring, carries the feed device. In this context "divided horizontally" means that both the first ring part and also the second ring part form a complete ring, which ring parts may respectively also have vertical projections, so that the ring does not have a horizontal separation plane in the narrower sense, but rather complex separation surfaces.

Thus, a preferred embodiment of the filling machine is one which is distinguished in that both the first ring part and the second ring part have projections with intermediate spaces disposed therebetween, in the direction of the circle, and that in the operative position of the supply container the projections engage into the intermediate spaces between the respective other projections for transmission of the drive forces in positively locking relationship. That ensures transmission of the drive force in positive locking relationship and avoids slippage between the two ring parts and thus between the feed device and the drive thereof.

In the last-mentioned embodiment the intermediate spaces are preferably larger than the projections respectively engaging into same. In that way it is particularly easy for the two ring parts, upon pivotal movement of the supply container out of the pivoted-away position into its operative position, to be coupled together in such a way that the drive forces are transmitted in positively locking relationship.

A preferred filling machine also has centering means for centering the feed device together with the second ring part with respect to the first ring part. In particular for that purpose a preferred embodiment of the filling machine provides that the second ring part has an axial extension with a concentric peripheral surface which tapers conically towards the first ring part and which, in the operative position of the supply container, engages into a corresponding receiving means of the first ring part. Such a tapering peripheral surface on the second ring part, with a corresponding counterpart surface on the first ring part, not only provides for centering of the two parts relative to each other, but in addition it is also suitable for transmitting axial and radial forces acting on the feed device by way of the second ring part to the first ring part and the mounting thereof to the machine frame structure. If the peripheral surface of the second ring part and the corresponding counterpart surface of the first ring part taper suitably slightly, then the drive forces can also be transmitted in force-locking relationship by way of those surfaces from the first ring part to the second ring part and thereby to the feed device. Further coupling means for transmission of the drive forces would then be redundant. A disadvantage of such a tapered configuration however could be that the first and second ring parts could jam one into the other in such a way that they prevent the supply container from being pivoted away. In that case, a more heavily pronounced tapered configuration which only affords the centering action, with additional coupling means for transmission of the drive forces, would be preferable.

A preferred filling machine also has carriers elements which hold the second ring part releasably on the pivotable supply container and which are so arranged that they are relieved of load in the operative position of the supply container. Those carrier elements thus hold the feed device only when the supply container is pivoted away. They are therefore loaded essentially only by the force caused by the weight of the feed device as the drive and reaction forces acting on the feed device in operation are transmitted directly to the machine frame structure by way of the two-part drive ring. The carrier elements can therefore be of a correspondingly light structure so that there are many possible ways of releasably holding the second ring part to the supply container.

In a preferred alternative form of the filling machine however the carrier elements form the projections which serve to drive the feed device and which co-operate with corresponding projections of the first ring part and which are formed by pins extending substantially radially outwardly from the second ring part. Those pins therefore hold the feed device not only in the pivoted-away position of the supply container but in addition they also transmit that part of the drive forces from the first ring part to the second ring part, which is not transmitted in some other fashion, for example by way of the above-mentioned tapered peripheral surface on the second ring part and the corresponding counterpart surface on the first ring part. By virtue of a suitable combination of the features, namely a given taper of the peripheral surface and a corresponding configuration in respect of the pins, the carrier elements only need to transmit such a low proportion of the drive forces that the options in regard to the design configuration of a releasable holding arrangement for holding the second ring part on the supply container are not restricted.

An alternative configuration of a filling machine with a releasable holding arrangement of that kind provides that the supply container has a peripherally extending, inwardly open groove and sliding sleeves are provided on the carrier elements of the second ring part, the sliding sleeves being displaceable for holding the second ring part to the supply container in such a way that they engage into the groove. An alternative structure in that respect provides that the supply container also has a peripherally extending, inwardly open groove, but the carrier elements on the second ring part are themselves movable in the radial direction in such a way that they can engage into the groove to hold the second ring part to the supply container. A further alternative structure is distinguished by an annular opening in the supply container, into which the carrier elements can be fitted, and by a releasable cover with which the opening can be covered in such a way that the arrangement affords an inwardly open groove extending around the supply container, in which the carrier elements are held. Alternatively it is also possible to provide an outwardly open groove in the second ring part and carrier elements which are mounted to the supply container and which are movable in the radial direction in such a way that they can engage into the groove in the second ring part.

Figure 2:
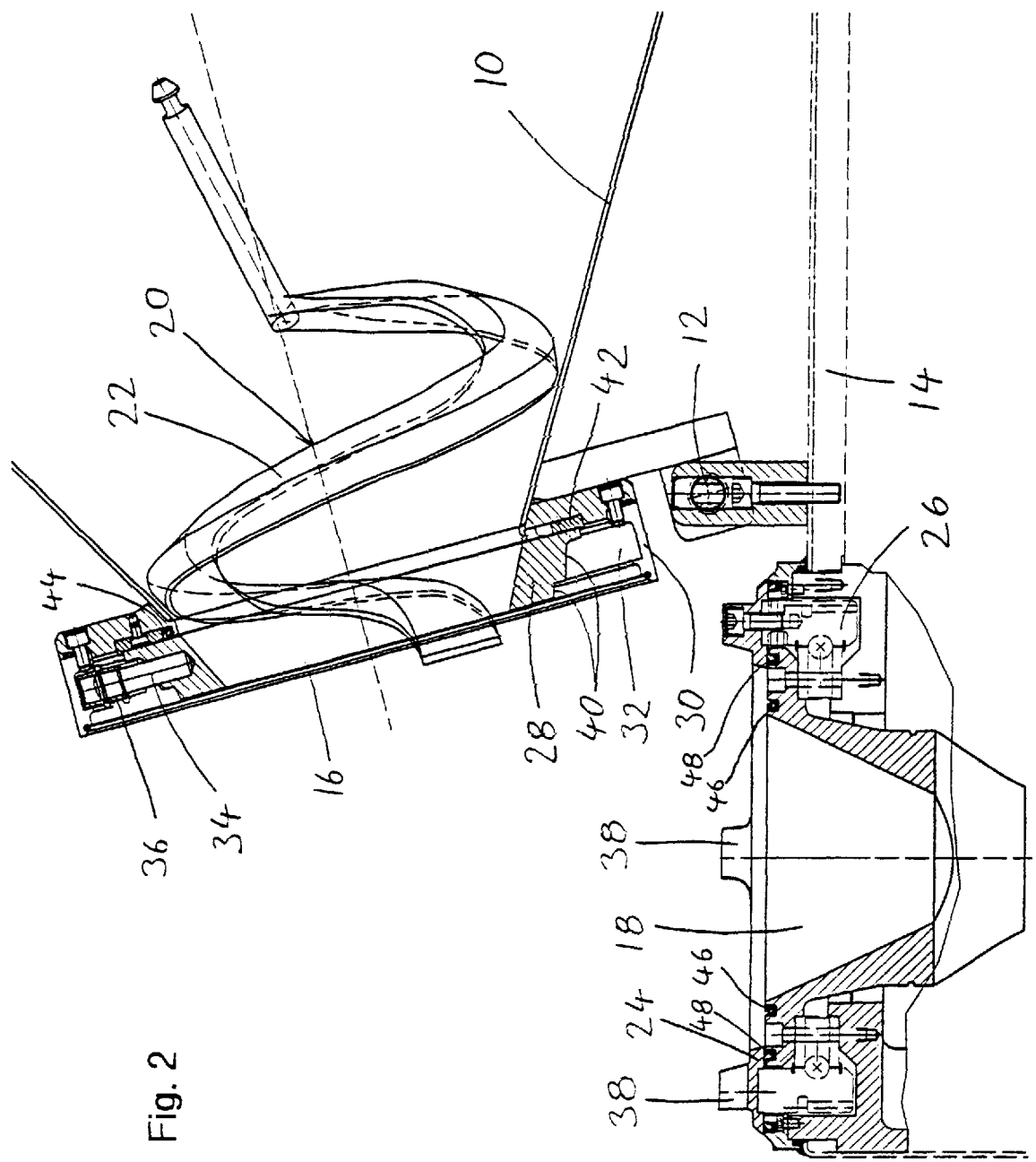
Figure 3:
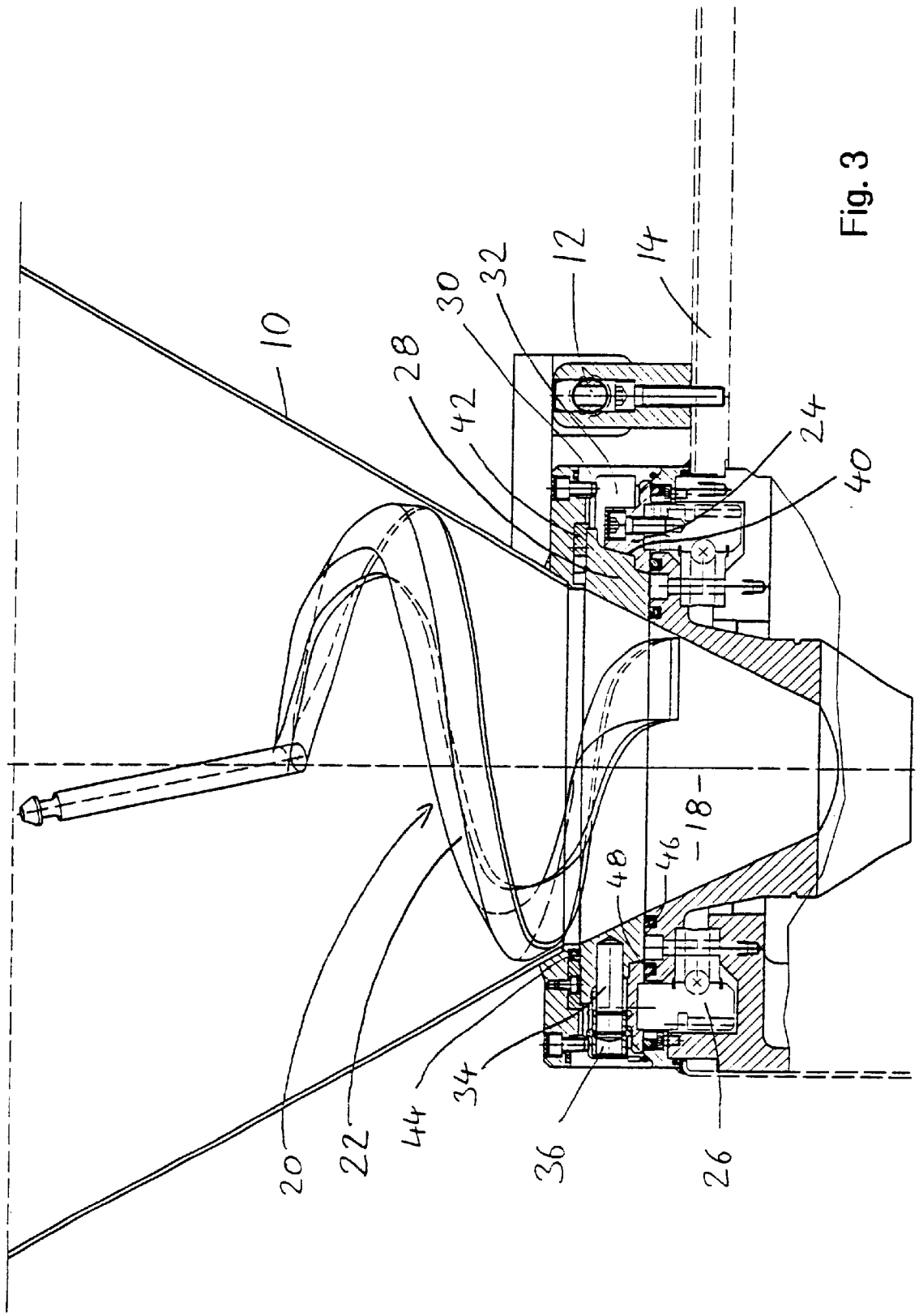
Figure 4:
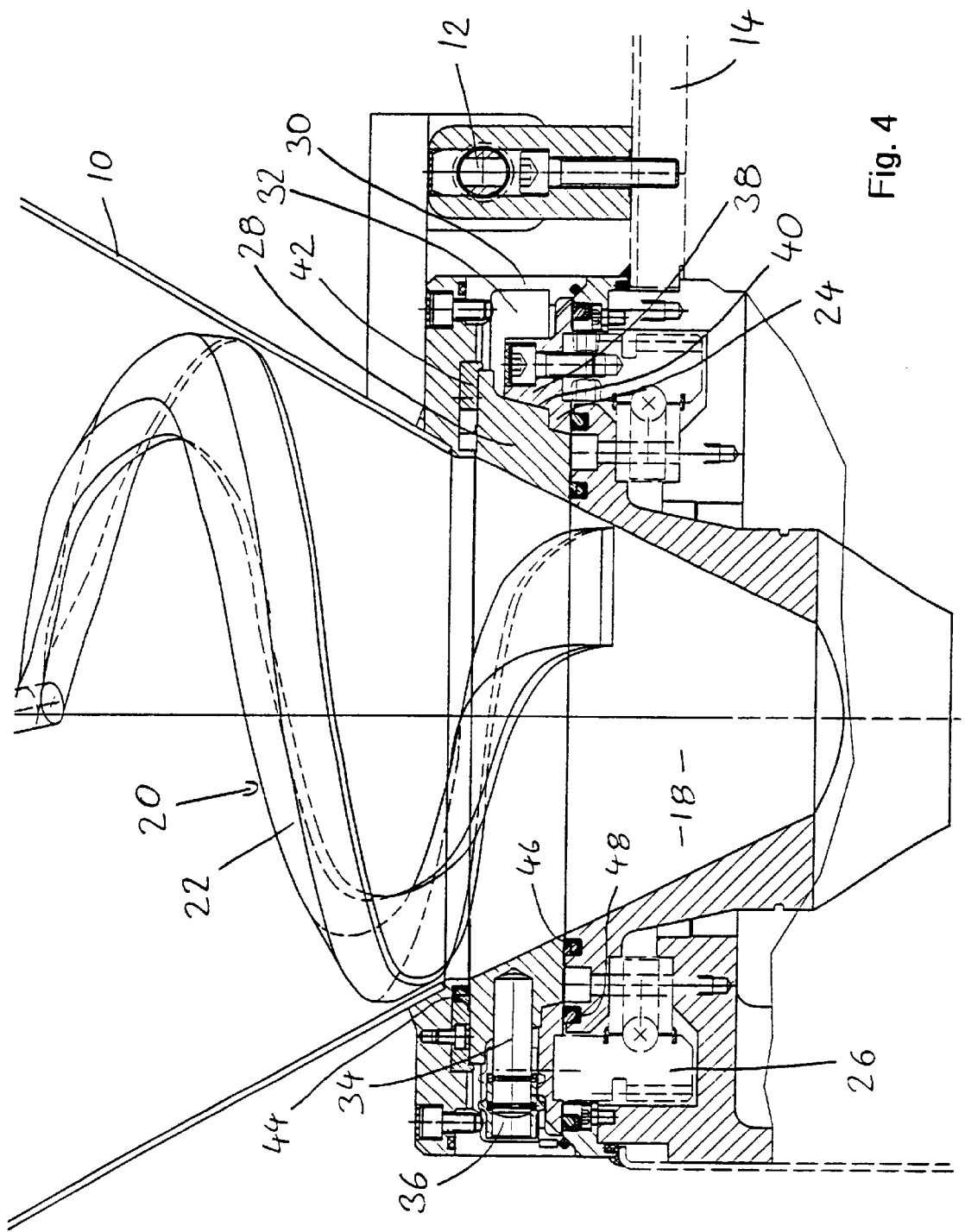
Figure 5:
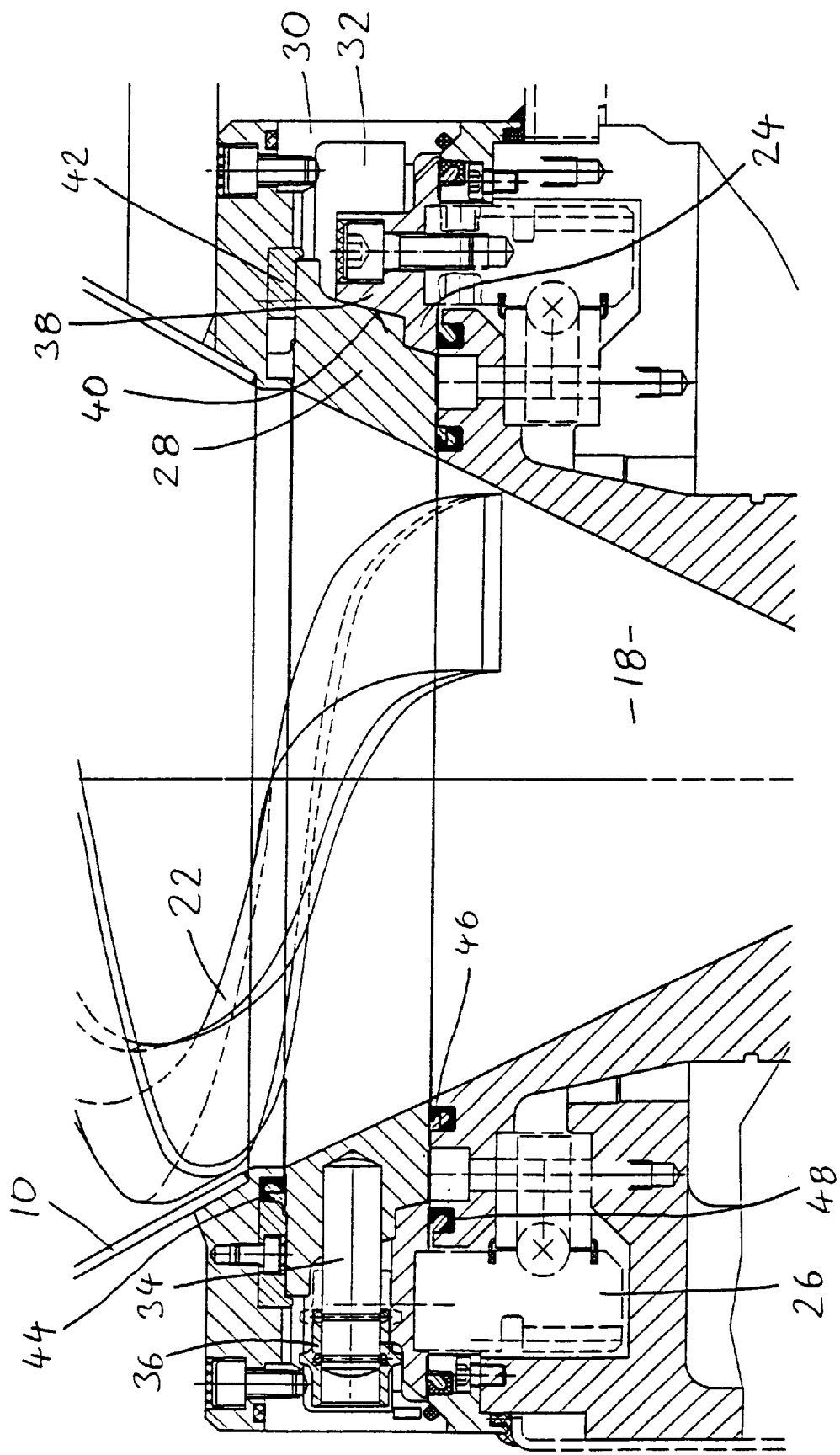

The invention will now be described in greater detail by means of an embodiment with reference to the drawings in which:

FIG. 1 shows a supply container, in a pivoted-away position, of a filling machine together with the adjacent parts of the filling machine, FIG. 2 is a view on an enlarged scale of a part of FIG. 1, FIG. 3 shows the part illustrated in FIG. 2, with the supply container pivoted in its operative position, FIG. 4 is a view on an enlarged scale of a part of FIG. 3, and FIG. 5 is a part of FIG. 4 on a still further enlarged scale.

The essential components of the filling machine include a funnel or hopper 10 which serves as a supply container and which is mounted by way of a pivot joint 12 to the machine frame structure 14 of the filling machine. In that way the funnel or hoper 10 can be pivoted between a position in which it is pivoted away as shown in FIGS. 1 and 2, and an operative position as shown in FIGS. 3 through 5.

In its operative position the hopper 10 can be filled from above and at its bottom has an open outlet 16 which opens into a feed arrangement 18 which is also funnel-shaped and which leads to a delivery pump (not shown) of the filling machine.

Disposed upstream of its outlet 16 in the interior of the hopper 10 is a feed device 20 whose essential component is a helically curved displacement member 22. It extends in the immediate proximity of the inside wall of the hopper 10 and accordingly like the hopper 10 increases in diameter in an upward direction. The feed displacement member 22 is driven in rotation in the operative position of the hopper 10 and thus in the manner of a conveyor screw conveys material adhering to the inside wall of the hopper 10 in the region of the outlet 16 thereof to the outlet 16. The feed device 20 can also be removed so that the filling machine can also be operated without the feed device 20.

A two-part drive and carrier ring serves for driving and mounting the feed device 20. The two-part ring has a first or lower ring part 24 which is mounted together with a toothed ring 26 screwed thereto in the machine housing 14. The toothed ring 26 is externally toothed and can accordingly be driven by way of a pinion (not shown).

A second or upper ring part 28 carries the feed device 20. It is held releasably to the hopper 10. For that purpose, in the proximity of its outlet 16 the hopper 10 has a collar or flange 30 with a peripherally extending, inwardly open annular groove 32. Fixed to the upper ring part 28 are radially outwardly extending pins on each of which a sliding sleeve 36 is arranged displaceably in the longitudinal direction of the respective pin 34. The sliding sleeves 36 can be displaced outwardly to such an extent that they engage into the annular groove 32 in the collar 30 of the hopper 10 and in that way retain the upper ring part 28 together with the feed device 20 to the hopper 10. The pins 34 together with their sliding sleeves 36 thus serve as carrier elements for holding the feed device 20 to the hopper 10.

In order to dismantle the feed device 20 the sliding sleeves 36 must be pushed inwardly on the pins 34 to such an extent that they no longer engage into the annular groove 32 on the hopper 10. Then the feed device 20 together with the upper ring part 28 can be threaded out through the outlet 16 of the hopper 10.

In the operative position of the hopper 10 the two ring parts 24 and 28 are coupled together. For transmission of the drive forces acting in a tangential direction from the first ring part 24 to the second ring part 28, the first ring part 24 has upwardly projecting projections 38 with intermediate spaces which are disposed therebetween in the direction of the circle. In the operative position of the hopper 10 the pins 34 on the second ring part 28 engage into those intermediate spaces. When the first ring part 24 rotates, its projections 38 bear against the pins 34 and in that way entrain the second ring part 28. The projections 38 are of such a configuration that they only bear against the open part of the pins 34 but not against the further outwardly disposed sliding sleeves 36, if the latter are displaced entirely outwardly so that they engage into the annular groove 32. Transmission of the drive forces for the feed device 20 is thus effected by way of the toothed ring 26 which is screwed to the first ring part 24, the first ring part 24 itself, its projections 38, the pins 34 on the second ring part 28 and the second ring part 28 itself, to the feed displacement member 22.

The second ring part 28 also has a stepped conical peripheral surface 40 which projects downwardly in the operative position of the hopper 10 and which tapers in that direction. The inwardly facing surfaces of the first ring part 24 are of a compatible configuration to the peripheral surface 40 on the second ring part 28 so that the tapering peripheral surface 40 of the second ring part 28 bears against the inside surfaces of the first ring part 24 in the operative position of the supply container 10. That provides for centering of the second ring part 28 with respect to the first ring part 24. In addition in that way the second ring part 28 is supported on the first ring part 24 in such a fashion that forces acting radially or axially downwardly on the feed device 20 are transmitted by way of the second ring part 28 to the first ring part 24 and are carried by the mounting thereof to the machine frame structure 14.

In operation with a driven feed device 20, it can happen that the feed device 20 applies for example to meat in the hopper 10 a downwardly directed axial force which exceeds the force due to the weight of the feed device 20. The reaction forces reacting on the feed device 20 are then added to the force due to the weight of the feed device 20 to form a force which is overall directed upwardly. That force is carried by a bronze ring 42 serving as a plain bearing in the collar 30 of the hopper 10. The bronze ring 42 is disposed in that part of the collar 30 which extends substantially horizontally in the operative position of the hopper 10. It co-operates with a flat surface on the top side of the second ring part 28.

With the exception of the last-mentioned situation, no forces are applied to the hopper 10 by the feed device 20. On the contrary, the forces are transmitted directly to the machine frame structure 14 by way of the two ring parts 28 and 24. Therefore, the hopper 10 is subjected to the effect essentially only of the forces which are applied to the inside wall of the hopper for example by the meat in the interior thereof. In addition, in the operative position of the hopper 10, the feed device 20 together with the second ring part 28 are held in a fixed position by the first ring part 24 and the bronze ring 42 so that the hopper 10 and the second ring part 28 do not have to be carried for example by the pins 24 and the sliding sleeves 36. In actual fact the size of the annular groove 32 is such that the sliding sleeves 36 do not touch any of the inside surfaces of the groove 32 in the operative position of the hopper 10.

A total of three seals 44, 46 and 48 are provided for sealing integrity in respect of the drive and carrier ring consisting of the first and second ring parts 24 and 28 with respect to the collar 30 of the hopper 10 on the one hand and with respect to the feed arrangement 18 fixed to the machine frame structure 14 on the other hand. It is preferred that all three seals are removable when the hopper 10 is in the pivoted-away position or the feed device 20 is dismantled.

The seal 44 is preferably arranged in the immediate proximity of the bronze ring 42 and bears against the radially inward peripheral edge of the bronze ring 42, more specifically jointly with same in a downwardly open annular groove in the collar 30. The seal 44 seals off a flat top side of the second ring part 28 with respect to the collar 30 of the hopper 10.

The two seals 46 and 48 are respectively let into their own specific upwardly open annular grooves in the flat top side of the feed arrangement 18 and are arranged in mutually concentric relationship. One of the two seals, the seal 46, seals a flat underside of the second ring part 28 with respect to the feed arrangement 18 while the radially further outwardly disposed seal 48 seals the second ring part 24 with respect to the flat top side of the feed arrangement 18.

What is claimed is:

1. A filling machine comprising a machine frame structure and a supply container which is pivotable from an operative position into a pivoted-away position and in front of the outlet of which is disposed a feed device which can be driven in rotation, in such a way that it can be pivoted away together with the supply container, characterised by:

a two-part drive ring for the feed device, whose first ring part is supported in the machine frame structure and driven there, and whose second ring part carries the feed device and can be pivoted away together with the supply container, and in the operative position of the supply container the second ring part is meshed to the first ring part so that the first ring part rotationally engages the second ring part for driving the feed device.

2. A filling machine as set forth in claim 1 characterised in that the second ring part in the operative position of the supply container engages into the first ring part so that the first ring part carries forces acting on the feed device and rotationally entrains the second ring part for driving the feed device.

3. A filling machine as set forth in claim 1 characterised in that the drive ring is arranged substantially horizontally and is divided horizontally.

4. A filling machine as set forth in one claim 1 characterised in that both the first ring part and the second ring part have projections with intermediate spaces disposed therebetween in the direction of the circle, and that in the operative position of the supply container the projections engage into the intermediate spaces between the respective other projections for transmission of the drive forces in positively locking relationship.

5. A filling machine as set forth in claim 4 characterised in that the intermediate spaces are larger than the projections respectively engaging into same.

6. A filling machine as set forth in claim 1 characterised by centering means for centering the feed device together with the second ring part with respect to the first ring part.

7. A filling machine as set forth in claim 1 characterised in that the second ring part has an axial extension with a concentric peripheral surface which tapers conically towards the first ring part and which in the operative position of the supply container engages into a corresponding receiving means of the first ring part.

8. A filling machine as set forth in claim 1 characterised by carrier elements which releasably hold the second ring part to the pivotable supply container and which are so arranged that they are relieved of load in the operative position of the supply container.

9. A filling machine as set forth in claim 4 characterised in that the carrier elements include pins which extend outwardly substantially radially from the second ring part and which form projections serving to drive the feed device and co-operating with the corresponding projections of the first ring part.

10. A filling machine as set forth in claim 8 characterised by an inwardly open groove which extends around the supply container and sliding sleeves on the carrier elements of the second ring part which are displaceable in such a way that they engage into the groove for holding the second ring part to the supply container.

11. A filling machine as set forth in claim 8 characterised by an inwardly open groove which extends around the supply container and characterised in that the carrier elements are movable in a radial direction on the second ring part in such a way that they can engage into the groove for holding the second ring part to the supply container.

12. A filling machine as set forth in claim 8 characterised by an annular opening in the supply container, into which the carrier elements can be inserted, and a releasable cover with which the opening can be covered so that there is provided an inwardly open groove which extends around the supply container and in which the carrier elements are held.

13. A filling machine as set forth in claim 8 characterised by a groove in the second ring part and characterised in that the carrier elements are mounted to the supply container and are movable in the radial direction, in such a way that they can engage into the groove in the second ring part.

14. A filling machine as set forth in claim 1, wherein the first and second ring part mesh together as a form-fitting clutch when the supply container is in the operative condition.

* * * * *